(12) United States Patent
Falter et al.

(10) Patent No.: US 7,617,480 B2
(45) Date of Patent: *Nov. 10, 2009

(54) SYSTEM AND METHOD FOR A WEB SERVICE VIRTUAL INTERFACE

(75) Inventors: Timm Falter, Sinsheim (DE); Joachim Bender, Weinheim (DE); Martin Huvar, Sinsheim (DE); Vladimir Savchenko, Sofia (BG); Volker Wiechers, Heidelberg (DE)

(73) Assignee: SAP AG, Walldorf (DE)

( * ) Notice: Subject to any disclaimer, the term of this patent is extended or adjusted under 35 U.S.C. 154(b) by 837 days.

This patent is subject to a terminal disclaimer.

(21) Appl. No.: 10/856,287

(22) Filed: May 28, 2004

(65) Prior Publication Data

US 2006/0031850 A1    Feb. 9, 2006

(51) Int. Cl.
 G06F 9/44 (2006.01)
(52) U.S. Cl. .............. 717/106; 717/108; 717/116; 717/118
(58) Field of Classification Search .............. 717/102, 717/103, 109, 113, 108
See application file for complete search history.

(56) References Cited

U.S. PATENT DOCUMENTS

| | | | |
|---|---|---|---|
| 5,956,487 A | 9/1999 | Venkatraman et al. | |
| 6,985,939 B2* | 1/2006 | Fletcher et al. | 709/223 |
| 7,017,162 B2* | 3/2006 | Smith et al. | 719/328 |
| 7,114,146 B2* | 9/2006 | Zhang et al. | 717/106 |
| 7,127,700 B2* | 10/2006 | Large | 717/100 |
| 7,266,582 B2* | 9/2007 | Stelting | 709/201 |
| 2002/0143819 A1 | 10/2002 | Han et al. | |
| 2003/0023957 A1* | 1/2003 | Bau et al. | 717/140 |
| 2003/0233631 A1* | 12/2003 | Curry et al. | 717/100 |
| 2004/0023957 A1 | 2/2004 | Wang et al. | |
| 2004/0064503 A1* | 4/2004 | Karakashian et al. | 709/203 |
| 2004/0133876 A1* | 7/2004 | Sproule | 717/105 |
| 2004/0177335 A1* | 9/2004 | Beisiegel et al. | 717/102 |
| 2004/0187140 A1* | 9/2004 | Aigner et al. | 719/328 |
| 2004/0199896 A1* | 10/2004 | Goodman et al. | 717/100 |
| 2004/0205104 A1* | 10/2004 | Harvey et al. | 709/200 |
| 2005/0015491 A1* | 1/2005 | Koeppel | 709/226 |
| 2005/0038867 A1 | 2/2005 | Henderson et al. | |
| 2005/0044197 A1 | 2/2005 | Lai | |
| 2005/0216600 A1* | 9/2005 | Maron | 709/236 |
| 2005/0235274 A1* | 10/2005 | Mamou et al. | 717/136 |
| 2006/0095274 A1* | 5/2006 | Phillips et al. | 705/1 |
| 2007/0271554 A1* | 11/2007 | Fletcher et al. | 717/147 |

OTHER PUBLICATIONS

Birbeck, et al., ""B2B Futures: WSDL and UDDI"", Professional XML 2nd Edition 2001—"B2B Futures: WSDL and UDDI" pages—cover of book, chapter 27 cover page and 1192-1218, (2001), cover page and 1192-1218.

* cited by examiner

*Primary Examiner*—Insun Kang
(74) *Attorney, Agent, or Firm*—Blakely Sokoloff Taylor & Zafman

(57) ABSTRACT

A development environment may receive input selecting a Web service implementation. The development environment may also receive input to define a virtual interface of the selected Web service implementation. The development environment may create a virtual interface descriptor file that includes the received input defining the virtual interface. The development environment may generate a Web service description based, at least in part, on the virtual interface descriptor file.

31 Claims, 13 Drawing Sheets

SYSTEM AND METHOD FOR A WEB SERVICE VIRTUAL INTERFACE

TECHNICAL FIELD

Embodiments of the invention generally relate to the field of Web services and, more particularly, to a system and method for a Web service virtual interface.

BACKGROUND

Web services are, in general terms, computer software (or, for ease of reference, software) based services that are provided over a network (e.g., the Internet). More specifically, Web services are self-contained, modularized, executable entities that can be published, searched for, and accessed across a network. Web services are portable across disparate computing platforms because they are implemented according to widely accepted standards.

FIG. 1 is a block diagram of the basic architecture of a conventional Web services framework 100. Conventional Web services framework 100 includes service provider 110, service consumer 120, and service directory 130. Service provider 110 may be, for example, a Web application server that is implemented according to any of the JAVA 2 Enterprise Edition specifications, for example, v1.3, published on Jul. 27, 2001 (hereinafter, the J2EE standard). One or more Web services are deployed on service provider 110. These Web services comply, at least in part, with the basic Web services standards including: the Extensible Markup Language (XML) standard promulgated by the World Wide Web Consortium (W3C) entitled, "Extensible Markup Language (XML) 1.0 (Second Edition)," 6 Oct. 2000 (hereinafter, the XML standard) and the Simple Object Access Protocol (SOAP) promulgated by the W3C entitled, "SOAP Version 1.1 Part 1: Messaging Framework and Part 2: Adjuncts," 24 Jun. 2003 (hereinafter, the SOAP protocol).

Service provider 110 publishes one or more Web services on service directory 130 via Web Service Definition Language (WSDL) document 140. A WSDL document may be a document that complies, at least in part, with any of the WSDL standards, for example, the WSDL standard promulgated by W3C entitled, "Web Services Description Language 1.1," 15 Mar. 2001 (hereinafter, the WSDL standard). WSDL document 140 is an XML document that provides pertinent information about a Web service such as its name, the methods that can be called, the parameters for the methods, and a location for sending requests.

Service directory 130 is a registry and discovery service for Web services. Service directory 130 may implement one of the Universal, Discovery, Description, and Integration of Web services (UDDI) specifications, for example, UDDI Version 3.0, Published Specification, Dated 19 Jul. 2002 (hereinafter, the UDDI specification). The UDDI specification defines a set of SOAP messages that are used to access XML-based data (e.g., WSDL document 140) in a directory. The UDDI specification also defines a registry information model to structure the data stored in service directory 130 and to make it easier to search and navigate.

Service consumer 120 is a computing device that locates and uses a Web service published in service directory 130. Service consumer 120 may be, for example, a Web application server, a general-purpose computer, a personal digital assistant, a telephone, and the like. Service consumer 120 may implement the UDDI specification to find and retrieve WSDL document 140. A number of files and classes may be generated based on retrieved WSDL document 140 to create a deployable Web service client package on service consumer 120. Service consumer 120 may generate a Web service client (not shown) based on the deployed Web service client package. The generated Web service client may then access the Web service from service provider 110 via, for example, the Internet.

Providing a Web service typically includes specifying the Web service behavior with respect to security, transactions, sessions, access point (e.g., Universal Resource Locator (URL)), etc. Some elements of the specified behavior are system specific. For example, the URL for an access point is clearly specific to the system providing the access point. One the other hand, some elements of the specified behavior could be defined once and remain valid on all of the systems to which the Web service is deployed. Conventional Web services do not distinguish between system specific and system independent behaviors.

SUMMARY OF THE INVENTION

Embodiments of the invention are generally directed to a system and method for a Web service virtual interface. A development environment may receive input selecting a Web service implementation. The development environment may also receive input to define a virtual interface of the selected Web service implementation. In an embodiment, the development environment may create a virtual interface descriptor file that includes the received input defining the virtual interface. The development environment may generate a Web service description based, at least in part, on the virtual interface descriptor file.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for a Web service virtual interface. A development environment may receive input selecting a Web service implementation. The development environment may also receive input to define a virtual interface of the selected Web service implementation. In an embodiment, the development environment may create a virtual interface descriptor file that includes the received input defining the virtual interface. As is further described below, the development environment may generate a Web service description based, at least in part, on the virtual interface descriptor file.

Figure 2:
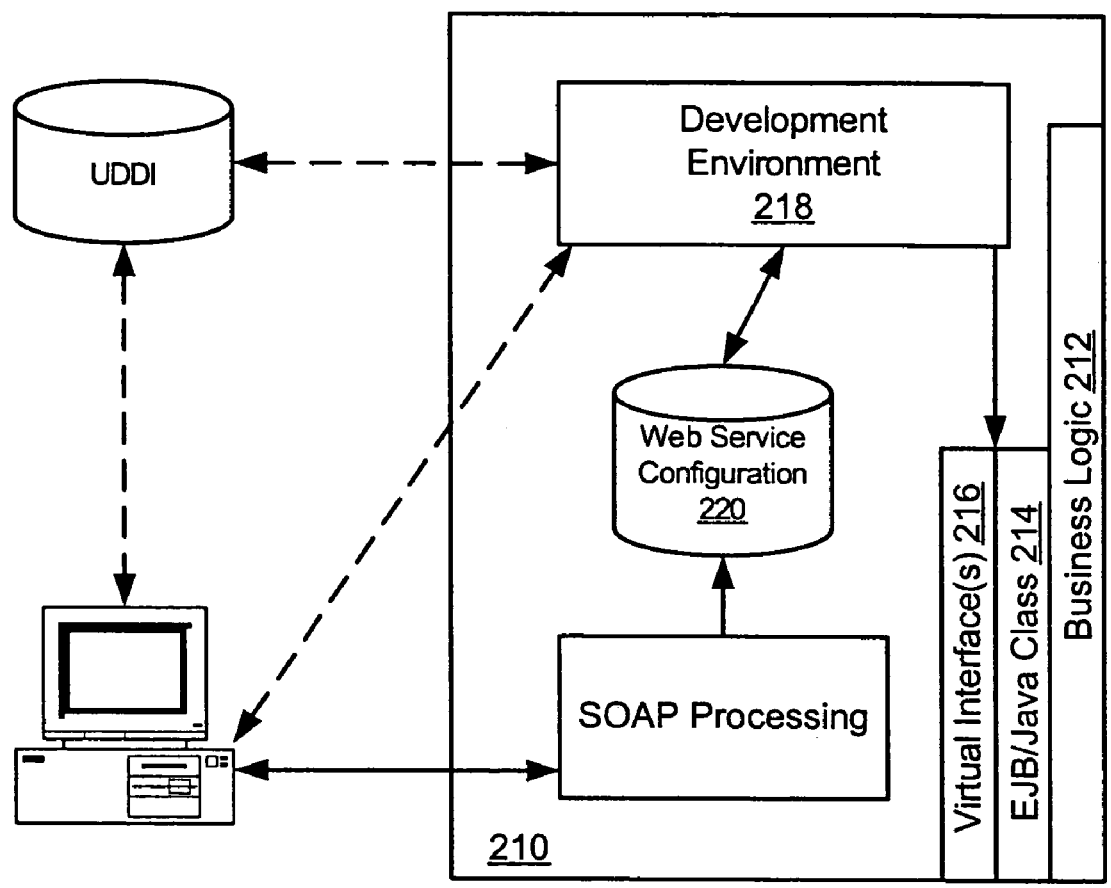
FIG. 2 is a block diagram of selected elements of a Web service provider, implemented according to an embodiment of the invention.

FIG. 2 is a block diagram of selected elements of a Web service provider 210 implemented according to an embodiment of the invention. In an embodiment, Web service provide may be part of a multi-tiered network. The multi-tiered network may be implemented using a variety of different application technologies at each of the layers of the multi-tier architecture, including those based on the JAVA 2 Enterprise Edition™ ("J2EE") platform, the Microsoft .NET platform, the Websphere platform developed by IBM Corporation, and/or the Advanced Business Application Programming ("ABAP") platform developed by SAP AG. Web service provider 210 includes business logic 212, web service implementation 214, virtual interface(s) 216, development environment 218, and Web service configurations 220. The term "business logic" refers to software that performs data processing. Business logic 212 may provide the operations that are packaged as a Web service.

In an embodiment, Web service implementation 214 is the actual logic provided in each Web service. Web service implementation 214 is called an "endpoint" of the Web service because it processes requests and/or provides responses. Virtual interface 216 is an abstract interface that provides a mechanism to define several views of Web service implementation 214 and to publish each view separately as a Web service. Web service configuration 220 specifies technical features of a Web service such as which transport binding to use. Web service implementation 214, virtual interface 216, and Web service configuration 220 are further described below with reference to FIG. 4.

Development environment 218 provides a software development environment for writing computer software. In an embodiment, Web service implementation 214, virtual interface 216, and/or Web service configuration 220 are developed in development environment 218. In an embodiment, development environment 218 is an implementation of, at least in part, the Eclipse Platform available under the Common Public License from the Eclipse Consortium. In an alternative embodiment, development environment 218 may be a different development environment.

Figure 3:
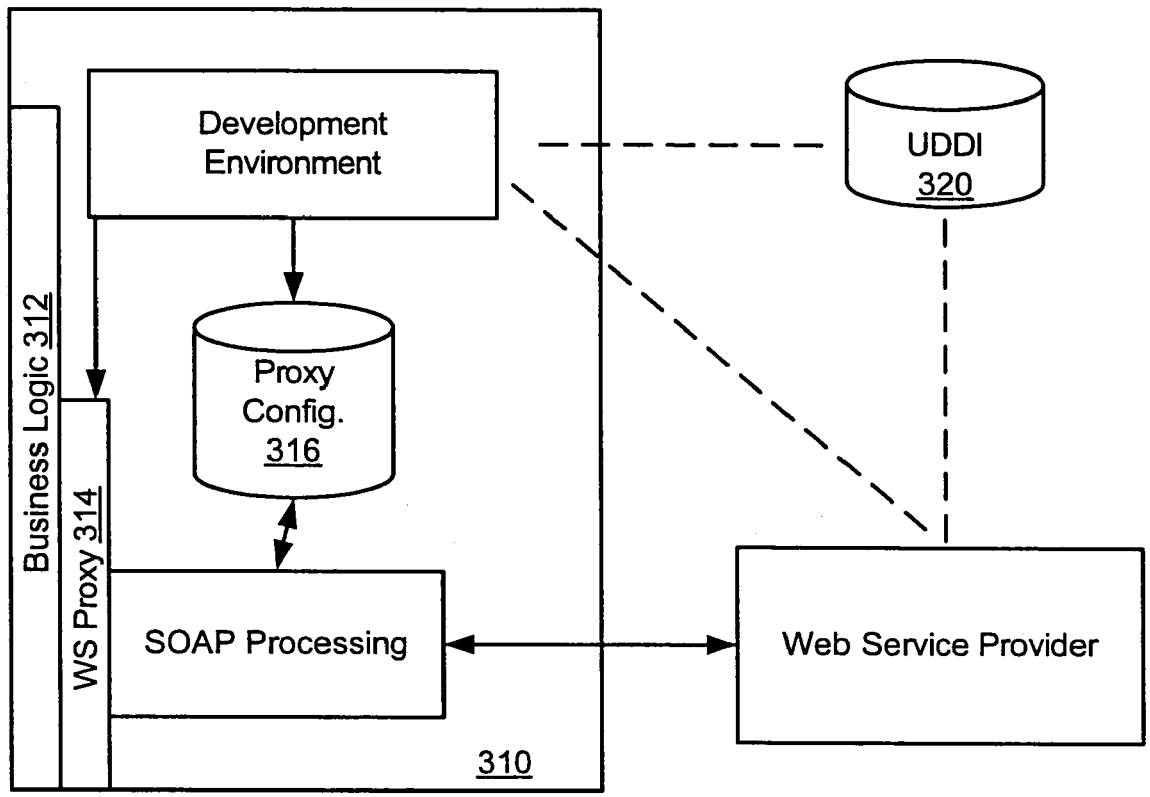
FIG. 3 is a block diagram of selected elements of a Web service consumer, implemented according to an embodiment of the invention.

FIG. 3 is a block diagram of selected elements of a Web service consumer 310, implemented according to an embodiment of the invention. In an embodiment, Web service consumer 310 includes business logic 312, Web service proxy 314, and proxy configuration 316. Business logic 312 may include an application(s) that sends a request for service to a Web service. The term "application" refers to software that performs work, such as data creation or manipulation.

In an embodiment, Web service proxy 314 is a local object that represents a Web service. Business logic 312 may access the Web service by invoking a method(s) in Web service proxy 314. In an embodiment, proxy configuration 316 specifies technical features of Web service proxy 314 such as which transport binding to use. Web service proxy 314 and proxy configuration 316 may be generated based, at least in part, on the information in a WSDL document that is downloaded from UDDI directory 320. As is further described below with reference to FIG. 6, proxy configuration 316 may map abstract features of the Web service to technical features implemented in Web service consumer 310.

Figure 4:
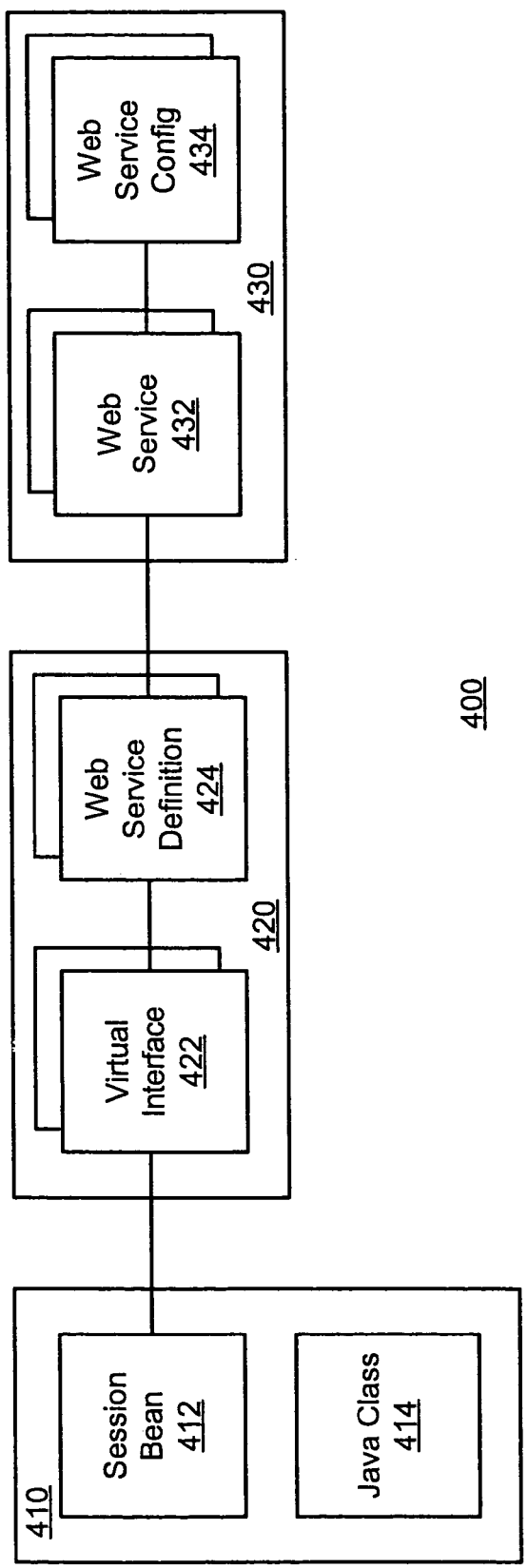
FIG. 4 is a block diagram of the general architecture of a Web service, implemented according to an embodiment of the invention.

FIG. 4 is a block diagram of the general architecture of Web service 400, implemented according to an embodiment of the invention. The illustrated embodiment includes Web service implementation 410, Web service design time part 420, and Web service configuration part 430. In alternative embodiments, the general architecture of a Web service may include more elements, fewer elements, and/or different elements. The architecture of Web service 400, as shown in FIG. 4, may be referred to as an "inside-out" architecture. The term "inside-out" refers to first developing Web service implementation 410 and then developing one or more Web service design time parts 420 and one or more Web service configuration parts 430 for Web service implementation 410.

In contrast to the architecture shown in FIG. 4, many conventional Web service have an "outside-in" architecture. An "outside-in" architecture refers to starting with a Web service design time part (e.g., Web service design time part 420) and developing a Web service implementation (e.g., Web service implementation 410). The JAVA Community Process (JCP) organization has promulgated a number of JAVA Specification Requests (JSRs) that may be implemented, at least in part, by Web service 400. For example, JSR-101 entitled, "JAVA Application Program Interfaces (APIs) for Extensible Markup Language based Remote Procedure Calls," Oct. 28, 2003 (hereinafter, the JAX-RPC specification) provides a standard set of JAVA APIs that provide a foundation for developing and deploying Web services on the JAVA platform. Similarly, JSR-109, entitled, "Implementing Enterprise Web Services," Nov. 15, 2002 (hereinafter, the JSR-109 specification) provides mechanisms for deploying a Web service in a JAVA 2 Platform, Enterprise Edition (J2EE) environment.

Web service implementation 410 is the actual logic behind Web service 400. In an embodiment, enterprise session bean 412 is the logic that provides the methods of Web service 400. The term "enterprise bean" refers to business logic that retrieves and/or processes data and provides that data to, for example, a user. In an alternative embodiment, the business logic may be provided by a different implementation. For example, in an embodiment, Web service implementation 410 is provided by JAVA class (or JAVA classes) 414. In yet another alternative embodiment, business logic 410 may be provided by, for example, an application developed in C#. The term "C#" refers to an application developed according to any of the C# programming language platforms including, for example, the C# Language Specification, Mar. 20, 2001.

In an embodiment, Web service design time part 420 provides a description of Web service 400 in terms of abstract features, rather than specific technical implementations. Thus, the developer of Web service design time part 420 may focus on the logic of Web service implementation 410 rather than the actual binding information used to expose Web service 400. In an embodiment, Web service design time part 420 includes virtual interface(s) 422 and Web service definition(s) 424. A WSDL document may be generated and published on, for example, a UDDI directory based on virtual interface 422 and Web service definition 424, in an embodiment of the invention.

Virtual interface 422 is an abstract interface that provides a mechanism for defining multiple views of Web service implementation 410. Virtual interface 422 provides multiple "views" because it selectively exposes methods and parameters of Web service implementation 410. For example, virtual interface 422 may allow a computing device to rename or hide methods and parameters of Web service implementation 410. Also, virtual interface 422 may allow the computing device to define standard values for the parameters of Web service implementation 410. In an embodiment, virtual interface 422 may selectively convert parameter types (e.g., from integer to string). In addition, virtual interface 422 may allow the computing device to define the way the parameters are represented in SOAP messages (e.g., as either an element or an attribute, namespaces, etc.). In an embodiment, multiple virtual interfaces 422 may be implemented for Web service implementation 410. In such an embodiment, each client accessing Web service 400 may have a different view of Web service implementation 410.

In addition, virtual interface 422 provides an abstraction layer over the endpoint types (e.g., an abstraction layer over the underlying EJBs™ and JAVA classes). The elements of Web service 400 that follow from virtual interface 422 (e.g., Web service definition 424 and Web service configuration part 430) are based on the abstract metadata of virtual interface 422 rather than implementation 410. Thus, in an embodiment, a SOAP runtime implementation (not shown) is not specific to implementation 410, rather it is based on the generic metadata of, for example, virtual interface 422.

Web service definition 424 is an abstract definition of the capabilities and requirements of Web service 400. In an embodiment, the capabilities of and requirements of Web service 400 are described in terms of abstract features and properties in Web service definition 424. During the configuration of Web service 400, these abstract features and properties may be mapped to specific runtime technical features. In an embodiment, the abstract features and the runtime features mapped to them are the basis for a Web service client (not shown). In an embodiment, each Web service definition 424 references a virtual interface 422 and there may be multiple Web service definitions 424 for each virtual interface 422.

In an embodiment, Web service definition 424 does not contain system specific data (e.g., does not contain application server specific data). Since Web service definition 424 does not contain system specific data, it may be defined once and then transported to a variety of different systems. In an embodiment, transporting Web service definition 424 to a variety of different systems includes transporting Web service definition 424 across multiple scenarios in one system landscape (e.g., from a development system to a test system to a productive system, etc.). In an embodiment, transporting Web service definition 424 to a variety of different systems also includes transporting Web service definition 424 from a provider of Web services to a customer.

An advantage to the architecture of Web service 400 is that a single implementation 410 may be exposed in multiple ways. For example, implementation 410 may have multiple virtual interfaces 422. Each virtual interface 422 (or selected virtual interfaces 422) may, in turn, be defined by one or more Web service definitions 424. In contrast to the architecture of Web service 400, conventional, Web services generate separate implementations based on a single WSDL document.

In an embodiment, Web service configuration part 430 binds an abstract Web service to particular transports, bindings, and protocols. Web service configuration part 430 may include Web service 432 and Web service configuration 434. Web service 432 references Web service definition 424 and provides a container for one or more Web service configurations 434. The term "container" broadly refers to an entity that provides services to another entity. The services provided by a container may include, for example, lifecycle management, security, connectivity, transactions, and/or persistence.

In an embodiment, Web service configuration 434 specifies which transport binding will be used, a security configuration, a target address, and/or documentation for the operations of the configuration. In addition, Web service configuration 434 may specify which design-time feature will be mapped to which runtime feature. The term "design time" refers to the design and development of computer software. The term "runtime" refers to the actual execution of software. In an embodiment, each Web service configuration 434 is mapped to a WSDL port. The term "port" may refer to an association between a port type and a binding. For further information regarding bindings see, for example, the SOAP specification.

In an embodiment a Web service, at runtime, may have a client-side implementation and a server-side implementation. For ease of reference the client-side implementation is hereinafter referred to as a "Web service client" and the server-side implementation is hereinafter referred to as the "Web service." The role of the Web service client is to expose a method of the Web service to a client application and to send a request for service to the Web service. The role of the Web service is to process the request and provide a response. The Web service and the Web service client are more fully described below with reference to FIGS. 5-6.

Figure 5:
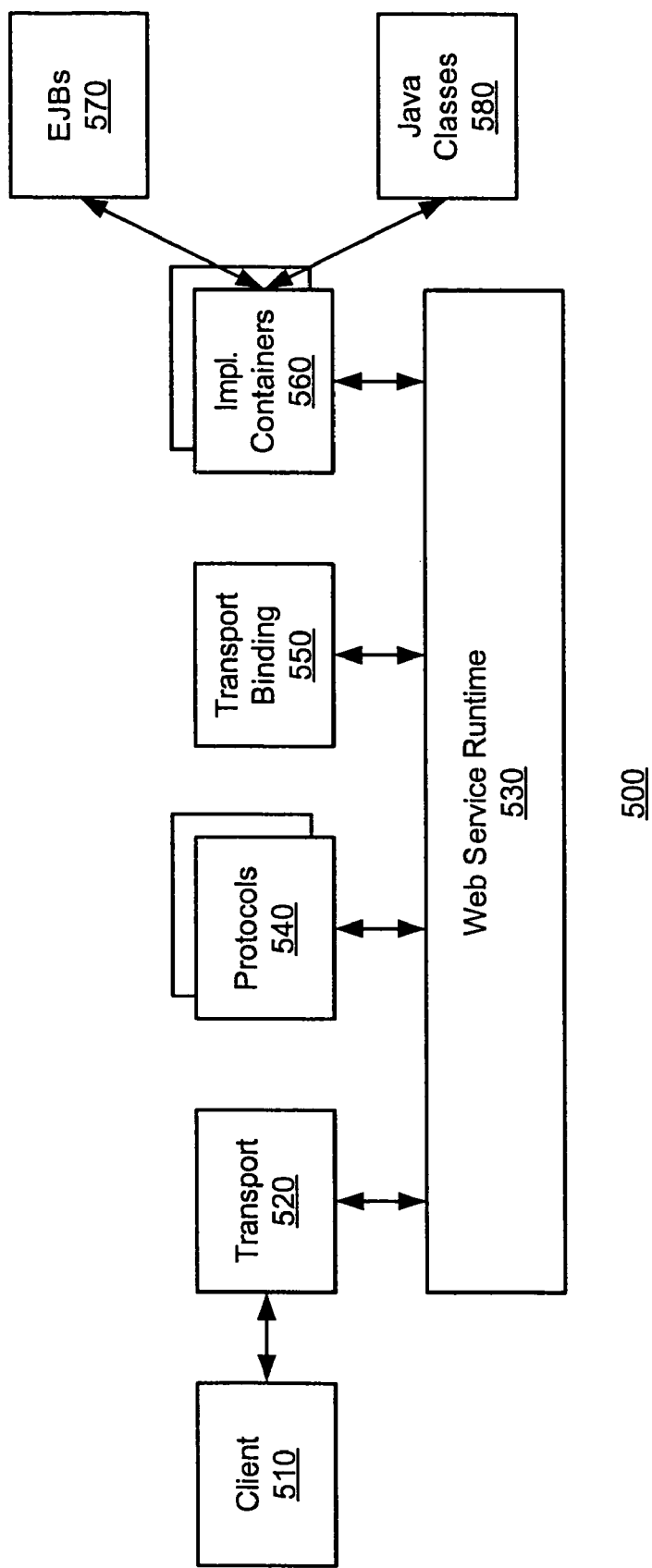
FIG. 5 is a block diagram illustrating selected aspects of the server-side of a Web service, according to an embodiment of the invention.

FIG. 5 is a block diagram illustrating selected aspects of the server-side of Web service 500, according to an embodiment of the invention. The illustrated embodiment of Web service 500 includes transport 520, Web service runtime 530, protocols 540, transport binding 550, and implementation containers 560. In an alternative embodiment, Web service 500 may include more, fewer, and/or different elements than those shown in FIG. 5. As illustrated in FIG. 5, Web service runtime 530 has a modular architecture. This modular architecture may be extended by, for example, adding (or removing) one or more protocols 540 and/or implementation containers 560. The components of Web service runtime 530 that may be selectively added and/or removed are referred to as "pluggable" components.

In an embodiment, transport 520 is an entity that receives a request for a Web service from client 510 and encapsulates that request in an identifier that specifies a configuration of Web service 500 that should process the received request. The identifier is used by Web service runtime 530 to determine which Web service configuration should process the received request. In an embodiment, a Web service configuration (e.g., Web service configuration 434, shown in FIG. 4) refers, in part, to the combination of protocols 540, transport binding 550, implementation container 560, and/or Web service implementation (e.g., Enterprise JavaBean™ 570 or JAVA classes 580) that processes the received request.

Web service runtime 530 takes the received request from transport 520 and determines which Web service configuration to invoke based on the identifier encapsulating the request. In an embodiment, the Web service configuration specifies which protocols 540 should be invoked to process the request. Protocols 540 are pluggable logic elements that process the request. In an embodiment protocols 540 may be security protocols (e.g., authentication and/or authorization protocols), session protocols, transport guarantee protocols, and the like. In an embodiment, protocols 540 are implemented as JAVA services.

The received request may include any of a number of data types and operation types that are mapped (or bound) to a transport layer protocol. In an embodiment, transport binding 550 converts the received request to, for example, JAVA objects that are used to invoke the Web service implementation (e.g., EJBs 570 or JAVA classes 580). Implementation containers 560 use the JAVA objects to invoke the methods of the Web service implementations. After the Web service implementation (e.g., EJBs 570 or JAVA classes 580) generates a response to the received request, transport binding 550 may convert a JAVA object representation of the response to a transport layer formatted response.

Figure 6:
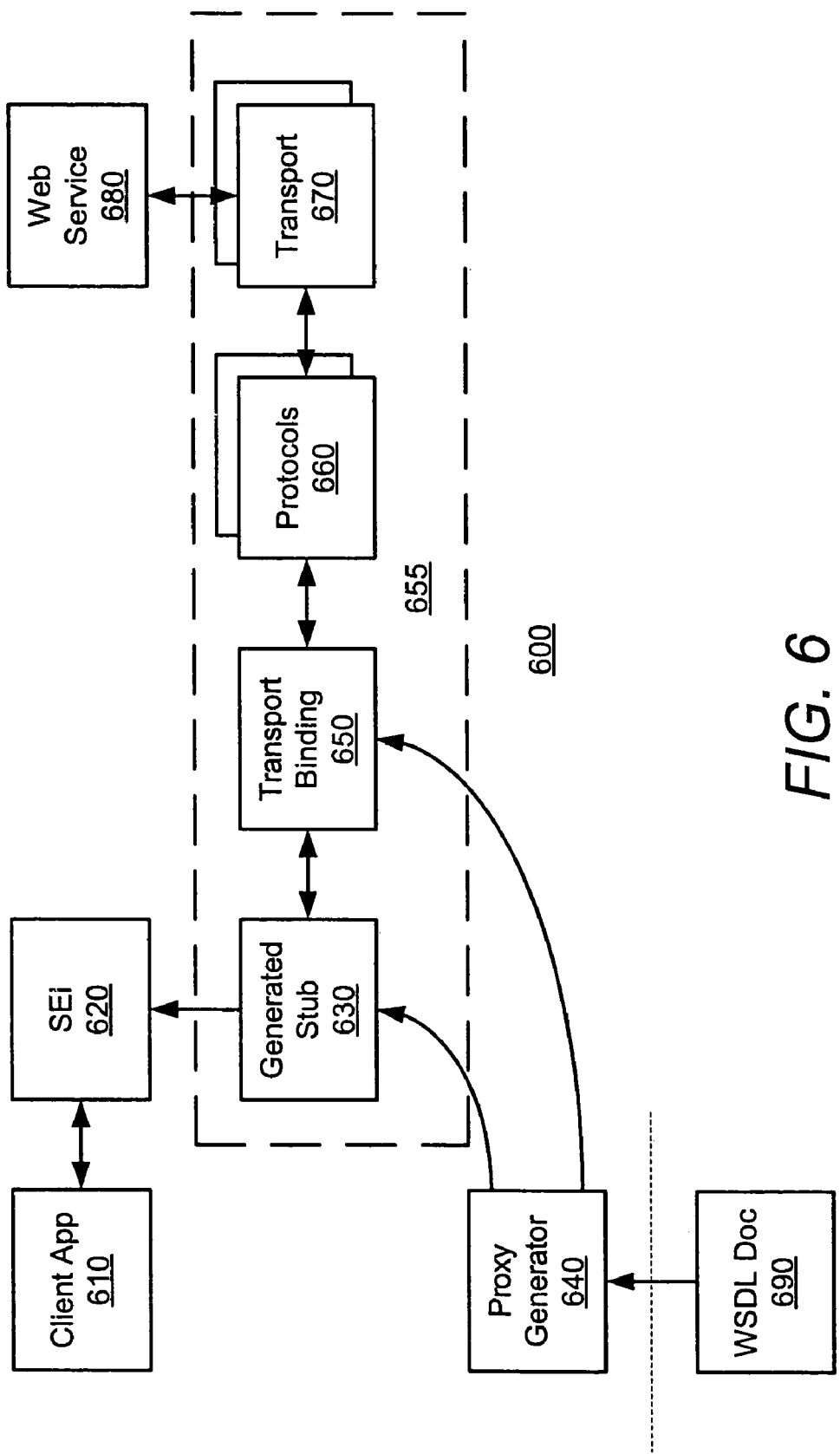
FIG. 6 is a block diagram of the general architecture of a Web service client, implemented according to an embodiment of the invention.

FIG. 6 is a block diagram of the general architecture of Web service client 600, implemented according to an embodiment of the invention. In an embodiment, Web service client 600 includes client application 610, Service Endpoint Interface (SEI) 620, generated stub 630, proxy generator 640, transport binding 650, protocols 660, and transport 670. In an alternative embodiment, Web service client 600 may include more, fewer, and/or different elements than those shown in FIG. 6. In the illustrated embodiment, Web service client framework 655 is modular and the various elements may, therefore, be referred to as being "pluggable."

Client application 610 may be any application that exchanges a request and/or a response with Web service 680. Client application 610 exchanges requests/responses with Web service 680 through one or more methods exposed by Service Endpoint Interface (SEI) 620. SEI 620 is the local representation of remote Web service 680. In an embodiment, SEI 620 also includes one or more logical ports (not shown) to provide a mechanism to locally configure Web service 680. For additional information regarding SEI 620 see, for example, the JAX-RPC specification and the JSR-109 specification.

Generated stub 630 includes the low-level classes that Web service client 600 uses to communicate with Web service 680. The low-level classes of generated stub 630 implement SEI 620. For additional information regarding generated stub 630 see, for example, the JAX-RPC specification. Proxy generator 640 parses WSDL document 690 and generates SEI 620 and stub 630 based, at least in part, on the information obtained from WSDL document 690. For additional information regarding proxy generator 640 see, for example, the JAX-RPC specification and the JSR-109 specification.

In an embodiment, transport binding 650 is a pluggable component that generates a request message(s) based on the settings of generated stub 630. When transport binding 650 receives a response(s) to the request message it converts the response from, for example, XML to JAVA objects. In an embodiment, transport binding 650 is implemented as a JAVA service. For additional information regarding transport binding 650 see, for example, the JAX-RPC specification and the JSR-109 specification.

In an embodiment, protocols 660 implement additional features (e.g., non-standardized functionalities) for Web service client 600. Examples of the features that may be implemented by protocols 660 include, but are not limited to, authentication functions, proxy server functions, header functions, and/or session functions. The functions implemented by protocols 660 may be independent of runtime features or may enhance runtime features. In an embodiment, protocols 660 are implemented as pluggable JAVA services. In an embodiment, protocols 660 use the SOAP message format to process incoming responses and/or outgoing requests. In alternative embodiments, protocols 660 implement a different message format.

Turning now to FIGS. 7-15, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement an embodiment of invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figure 7:
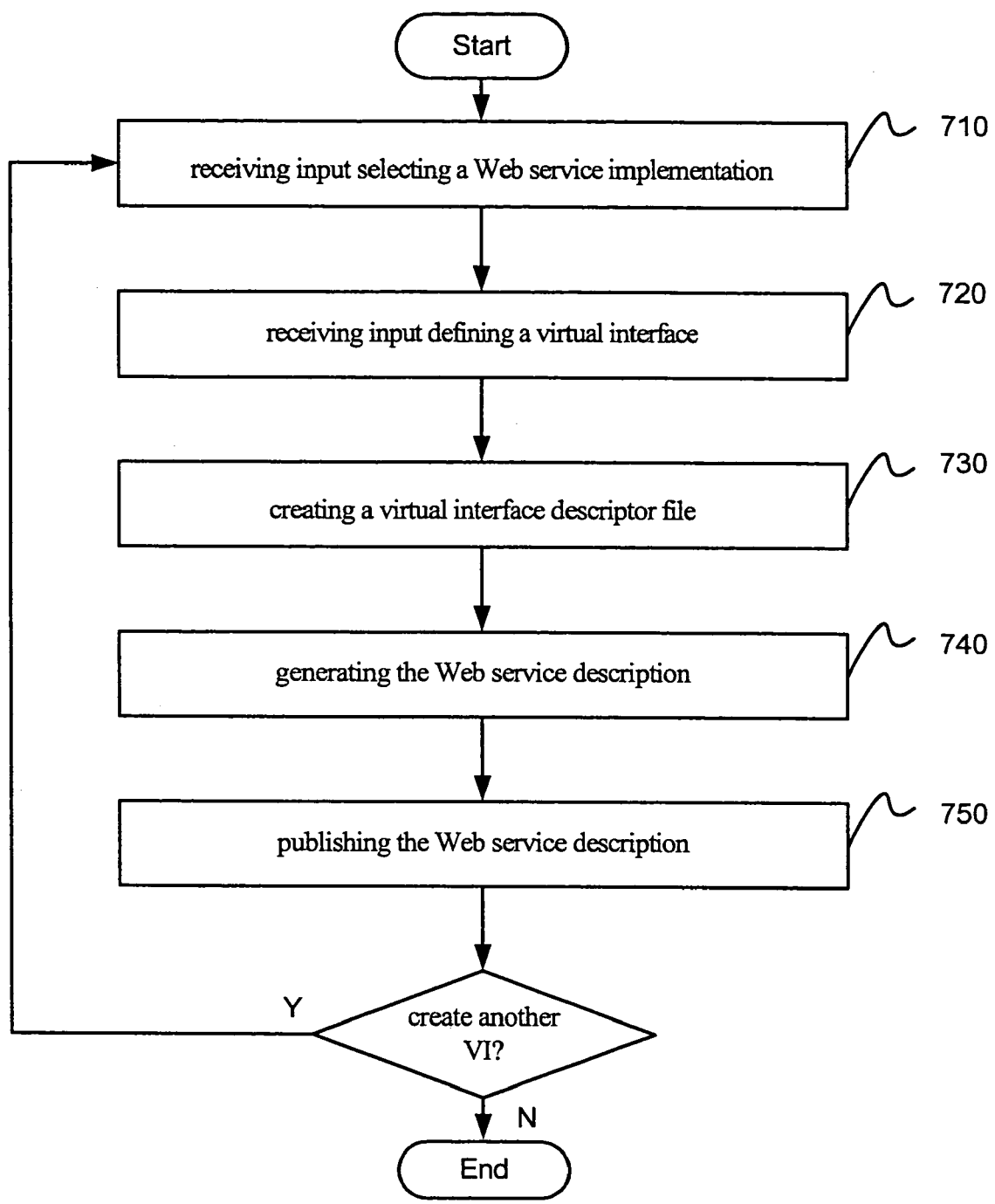
FIG. 7 is a flow diagram illustrating certain aspects of a method for creating and using a virtual interface, according to an embodiment of the invention.

FIG. 7 is a flow diagram illustrating certain aspects of a method for creating and using a virtual interface, according to an embodiment of the invention. Referring to process block 710, a development environment (or other computing entity) receives input selecting a Web service implementation. The selected Web service implementation may be, for example, an Enterprise JAVA Bean (EJB), a JAVA class, a C# class, etc. The term "receiving input" broadly refers to receiving an indication from a cursor control device, keyboard, touchscreen display, voice activated peripheral, remote system, etc.

Figure 8:
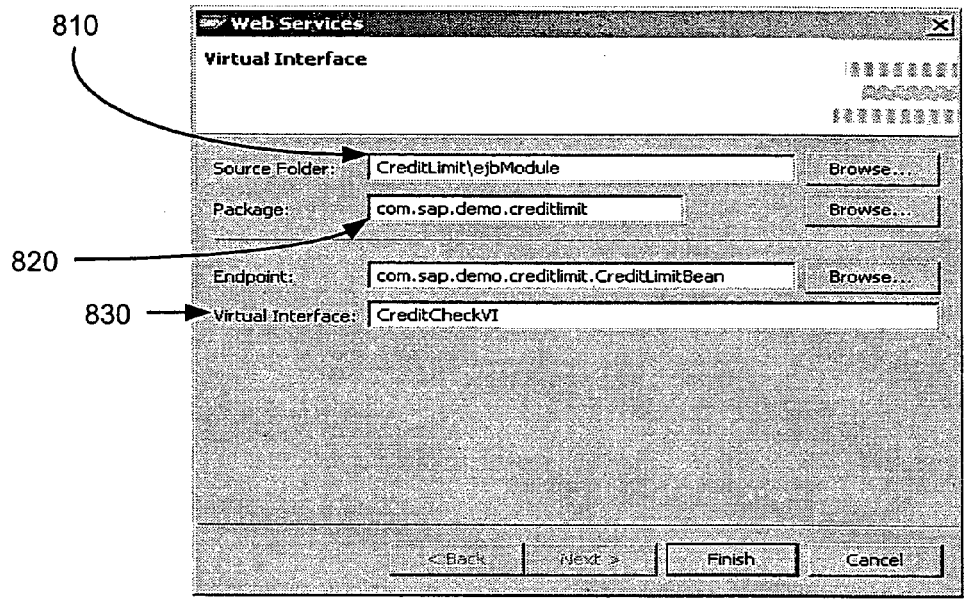
FIG. 8 illustrates aspects of selecting a Web service implementation, according to an embodiment of the invention.

FIG. 8 illustrates aspects of selecting a Web service implementation, according to an embodiment of the invention. A source folder containing the selected Web service implementation is shown at 810. In an embodiment, the source folder may be local to or remote from the computing device hosting the development environment. The name of a package containing the selected Web service implementation is show at 820. In an embodiment, a name for a virtual interface may be provided at 830.

Referring to process block 720, the development environment (or other computing entity) receives input that defines a virtual interface of the selected Web service implementation. In an embodiment, the virtual interface selectively exposes methods and parameters of the. Web service implementation. The virtual interface may also allow the development environment to define the way the parameters are represented in SOAP messages. In an embodiment, multiple virtual interfaces may be created for the Web service implementation. As is further described below with reference to FIG. 15, in an embodiment, a Web service description may be based, at least in part, on the received input defining the virtual interface.

In an embodiment, receiving input that defines a virtual interface may include receiving input that defines how a method of the Web service implementation is represented in a Web service (or in a Web service description). The term "method" may refer to processing provided by the Web service implementation. The phrase "defining a representation of a method" broadly refers to, for example, naming the method, selectively exposing the method, defining the parameters of the method, etc. In an embodiment, the complexity of an underlying Web service implementation may be "streamlined" by defining how the methods of the Web service implementation are represented in a Web service.

Figure 9:
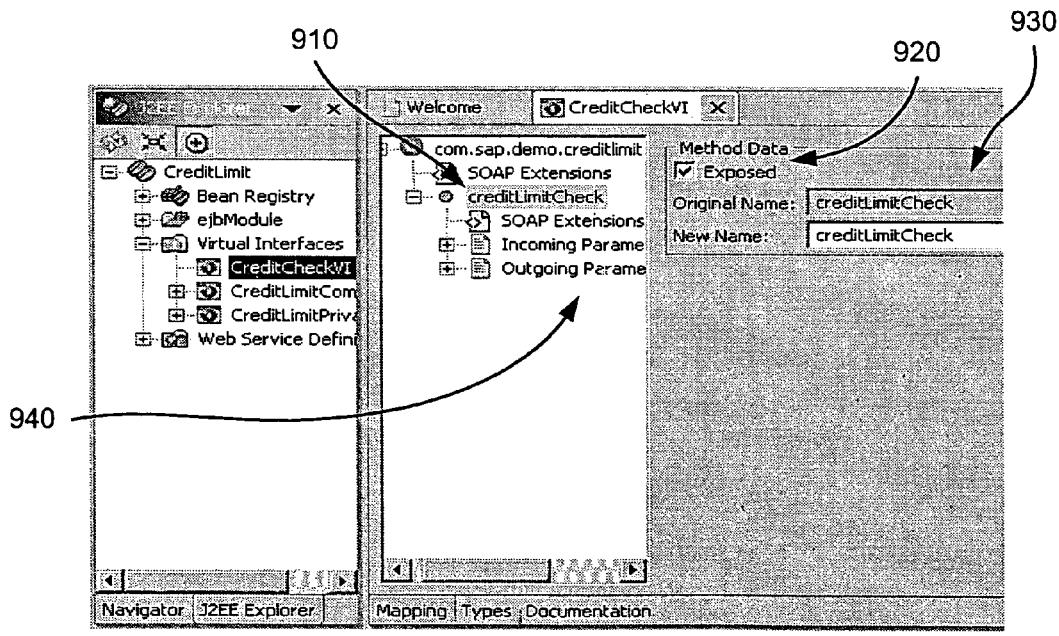
FIG. 9 illustrates selected aspects of defining the representation of a method, according to an embodiment of the invention.

FIG. 9 illustrates selected aspects of defining the representation of a method, according to an embodiment of the invention. Referring to reference number 910, the development environment receives input specifying a method of the Web service implementation. The received input may be, for example, an indication from a pointing device, a keyboard, a touch-screen, etc. Whether or not to expose an operation is indicated at 920. The name of the operation may be changed at 930. As is further described below, ingoing and outgoing parameters for the method may be selected (and defined) at 940.

In an embodiment, the format of messages used in a Web service may be specified in the virtual interface. In one embodiment, the messages sent between a Web service and its clients are based, at least in part, on the SOAP protocol. In such an embodiment, the virtual interface may include one or more "SOAP extensions" to define message formatting. The SOAP extensions may be data specifying a SOAP message format for a method and/or for one or more parameters of the method.

Figure 10:
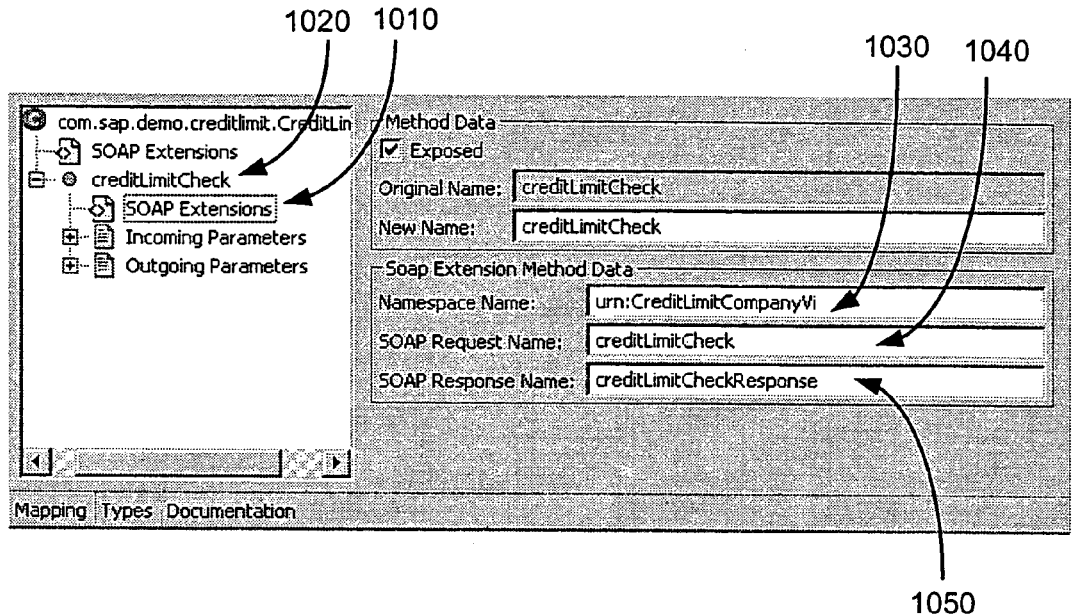
FIG. 10 illustrates aspects of defining selected message format details of a method, according to an embodiment of the invention.

FIG. 10 illustrates aspects of defining selected message format details for a method, according to an embodiment of the invention. SOAP extensions element 1010 may include formatting data for method 1020. For example, namespace 1030 may specify a namespace for the messages of method 1020. Namespace 1030 may provide a prefix (e.g., a Uniform Resource Indicator (URI)) for one or more elements of a message. The prefix may provide a mechanism to distinguish similarly named message elements. The prefix may also provide a mechanism for providing context for a message element (e.g., specifying whether a message element has a particular technical or business context).

In an embodiment, a SOAP response name may be specified in field 1040. In one embodiment the name provided in field 1040 specifies the name of a SOAP body element that wraps the request SOAP message for method 1020. A SOAP response name may be specified in field 1050. In one embodiment the name provided in field 1050 specifies the name of a SOAP body element that wraps the response SOAP message for method 1020. In an alternative embodiment, more formatting details, fewer formatting details, and/or different formatting details may be specified for a method.

Figure 11:
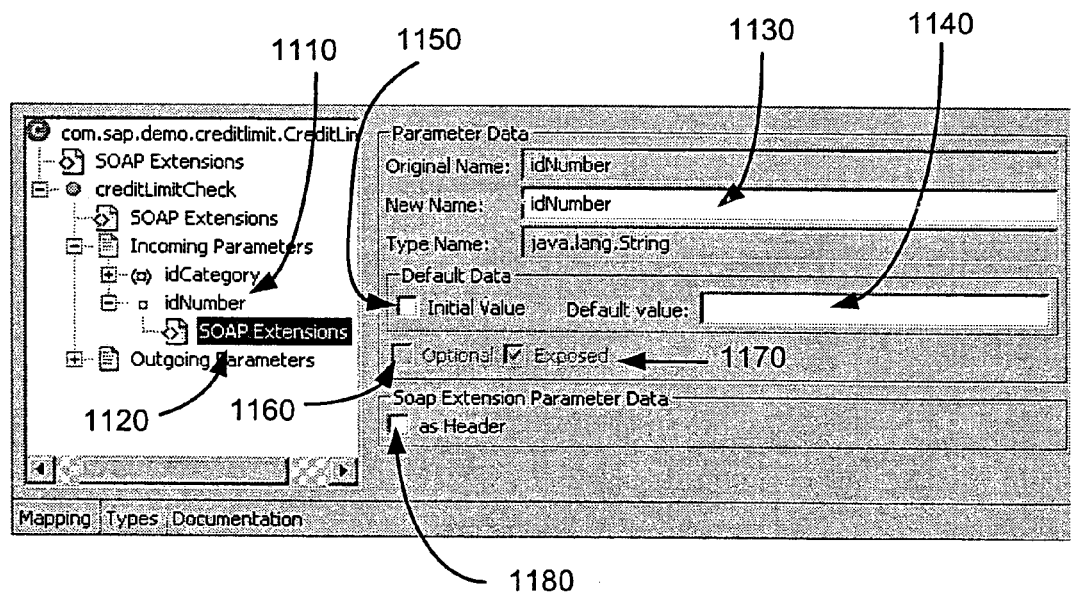
FIG. 11 illustrates selected aspects of specifying a representation of a parameter, according to an embodiment of the invention.

In an embodiment, the representation of one or more parameters of a method may be specified in the virtual interface. FIG. 11 illustrates selected aspects of specifying a representation of a parameter, according to an embodiment of the invention. Parameter 1110 is an incoming parameter for method 1020. The term "incoming parameter" may refer to a parameter that provides an input to a Web service. In one embodiment, the data defining the representation of parameter 1110 may, at least in part, be stored in SOAP extensions 1120. A name for parameter 1110 may be provided at 1130. In an embodiment a default value for parameter 1110 may be provided at 1140. The value provided at 1140 may be defined as an initial value rather than a default value by selecting box 1150. In one embodiment, a default (or initial) value for parameter 1110 may be provided if parameter 1110 is a simple data type (e.g., an integer or string).

In an embodiment, selection box 1160 provides a mechanism to define whether parameter 1110 is optional. Similarly, selection box 1170 provides a mechanism to define whether parameter 1110 is exposed in a Web service description (e.g., in a WSDL document). In one embodiment, the virtual interface specifies where within a message (e.g., in which element of a SOAP message) a parameter is sent. For example, in the illustrated embodiment, selection box 1180 provides a mechanism for specifying that parameter 1110 is to be sent in a SOAP header of a SOAP message.

In an embodiment, the Web service implementation underlying the virtual interface is composed of one or more classes (e.g., JAVA classes or C# classes). In such an embodiment, the virtual interface may define class data for the one or more classes. The term "class data" may refer to, for example, a name for a class and/or a namespace providing a schema for the class.

Figure 12:
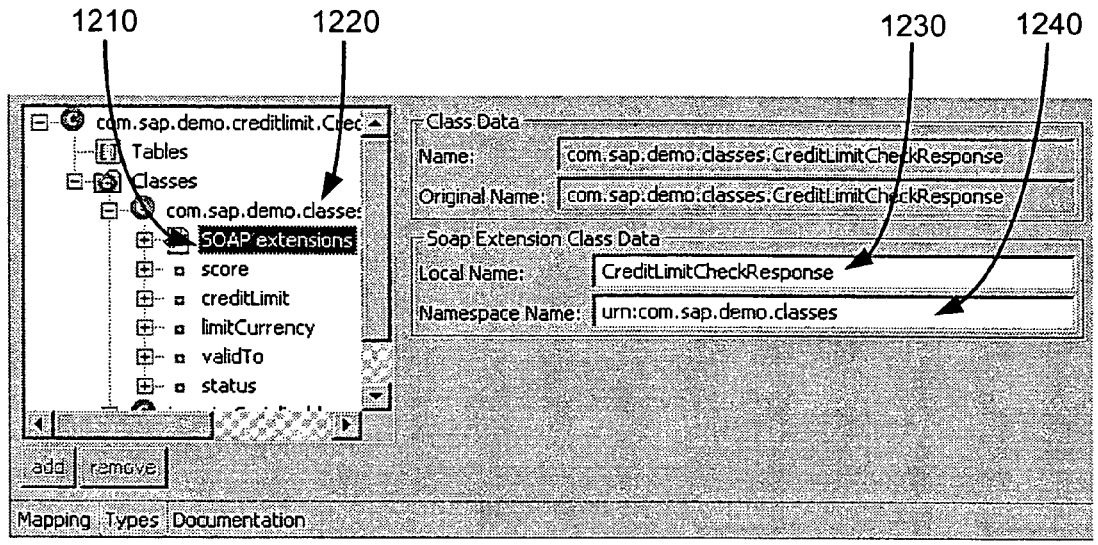
FIG. 12 illustrates selected aspects of defining class data in a virtual interface according to an embodiment of the invention.

FIG. 12 illustrates selected aspects of defining class data in a virtual interface according to an embodiment of the invention. In the illustrated embodiment, SOAP extensions 1210 may contain the defined class data for class 1220. In one embodiment, the defined class data includes local name 1230. Local name 1230 may specify a name for class 1220 (e.g., a complex type name) as used in a schema defining class 1220. The defined class data may also include namespace name 1240. In an embodiment, namespace name 1240 may identify a namespace of the schema defining class 1220. In an alternative embodiment, more class data, less class data, and/or different class data may be defined.

In an embodiment, the term "receiving input defining a virtual interface" may include receiving input (e.g., through a Graphical User Interface (GUI) or command-line driven interface) defining how a data type is to be represented in a SOAP message. For example, in an embodiment, the received input may specify whether a data type is an element or attribute of a message. The term "element" may refer to a structural element of a message (e.g., a SOAP message) that may carry data. The term "attribute" may refer to information that is provided for a particular element. Typically, an attribute is used to provide information to a software entity that is processing the data in an element of a message.

Figure 13:
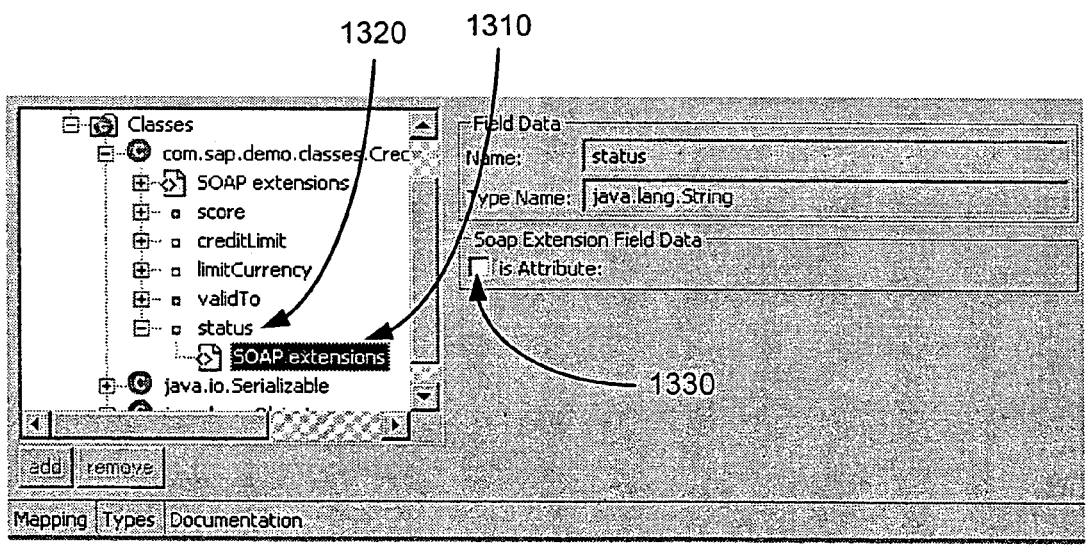
FIG. 13 illustrates selected aspects of specifying a data type according to an embodiment of the invention.

FIG. 13 illustrates selected aspects of specifying a data type according to an embodiment of the invention. In the illustrated embodiment, SOAP extensions 1310 may specify the data type for type 1320. In one embodiment, the default type is an element. Selection box 1330 provides a mechanism for specifying that type 1320 is to be represented as an element.

Referring again to FIG. 7, the development environment creates a virtual interface descriptor file at process block 730. A "virtual interface descriptor file" may provide metadata for the virtual interface with which it is associated. In one embodiment, the virtual interface descriptor file is an XML file that describes the virtual interface. The virtual interface file may provide, at least in part, the basis for a Web service description (e.g., a WSDL document). The term "creating" the virtual interface descriptor file may refer to placing at least a portion of the received input defining the virtual interface into a structured file such as an XML file.

In one embodiment, the virtual interface descriptor file provides part of the "design time" description of a Web service. The virtual interface descriptor file may be combined with, for example, a Web service definition descriptor file to provide, at least in part, the design time description of the Web service. This design time description of the Web service may provide the basis for a WSDL document.

Figure 14:
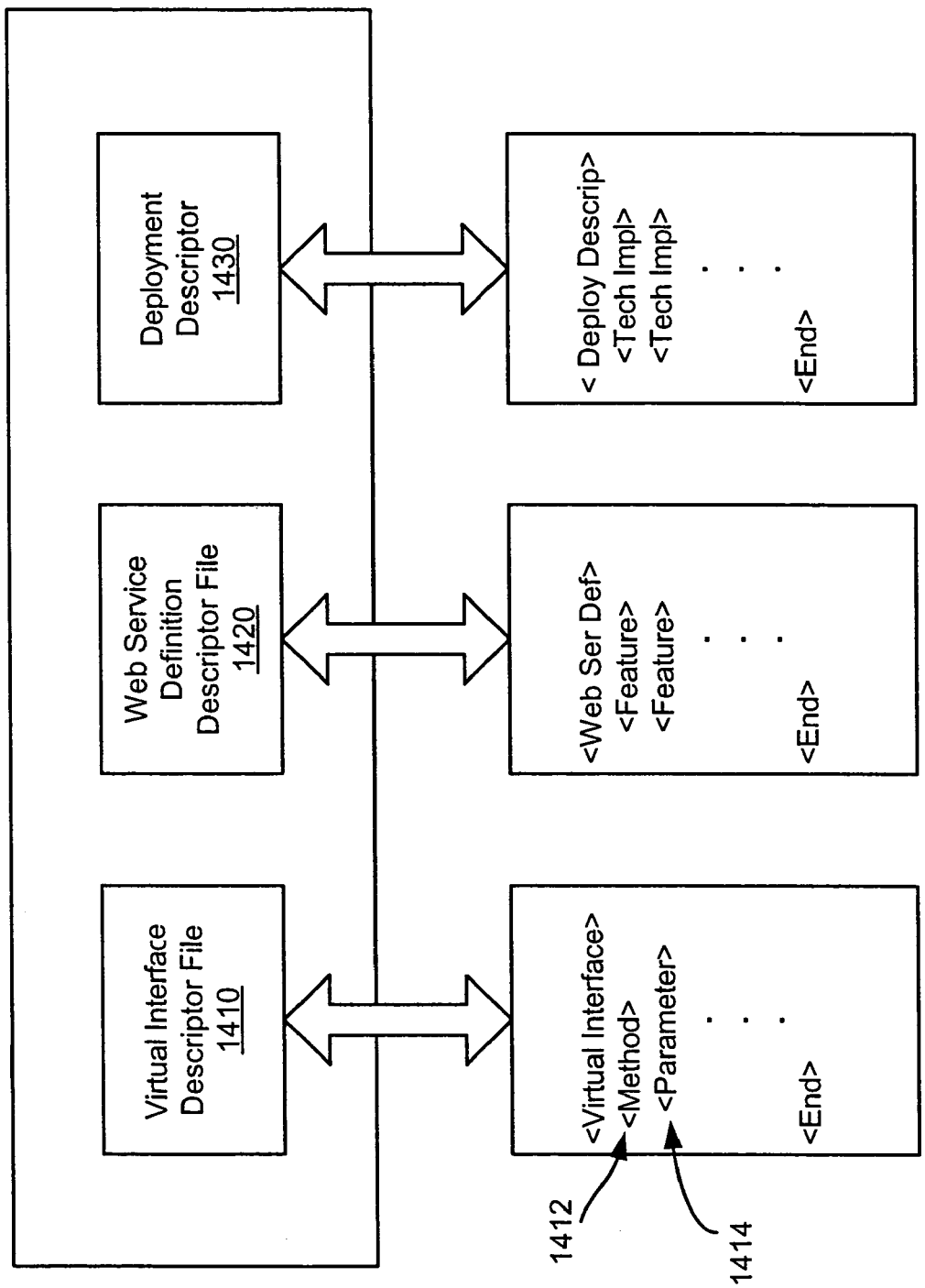
FIG. 14 is a block diagram illustrating selected aspects of a design time description of a Web service according to an embodiment of the invention.

FIG. 14 is a block diagram illustrating selected aspects of a design time description of a Web service according to an embodiment of the invention. The illustrated embodiment includes virtual interface descriptor file 1410, Web service definition descriptor file 1420, and deployment descriptor 1430. In an alternative embodiment, the design time description of the Web service may have more elements, fewer elements, and/or different elements.

Virtual interface descriptor file 1410 may describe a virtual interface of the Web service. For example, virtual interface descriptor file 1410 may specify which methods and/or parameters of a Web service implementation are exposed. In addition, virtual interface descriptor file 1410 may define message formatting details (e.g., SOAP message formatting details) such as namespaces for methods and/or parameters as well as whether a parameter is represented as an element or attribute in a message. For example, method element 1412 may include method specific data (e.g., whether it is exposed) and parameter element 1414 may include parameter specific data (e.g., a default value and/or whether it is to be represented as an element or attribute in a message). In one embodiment, virtual interface descriptor file 1410 is an XML file. It is to be understood, however, that in alternative embodiments, virtual interface descriptor file 1410 may be structured according to a different format, markup language, etc.

Referring to process block 740 of FIG. 7, the development environment may generate a Web service description based, at least in part, on virtual interface descriptor file 1410. In an embodiment, the Web service description may be a WSDL document. In such an embodiment, the development environment may parse the information contained in virtual interface descriptor file 1410 (e.g., elements 1412 and 1414). The parsed information may be used to specify the elements of the WSDL document.

Figure 15:
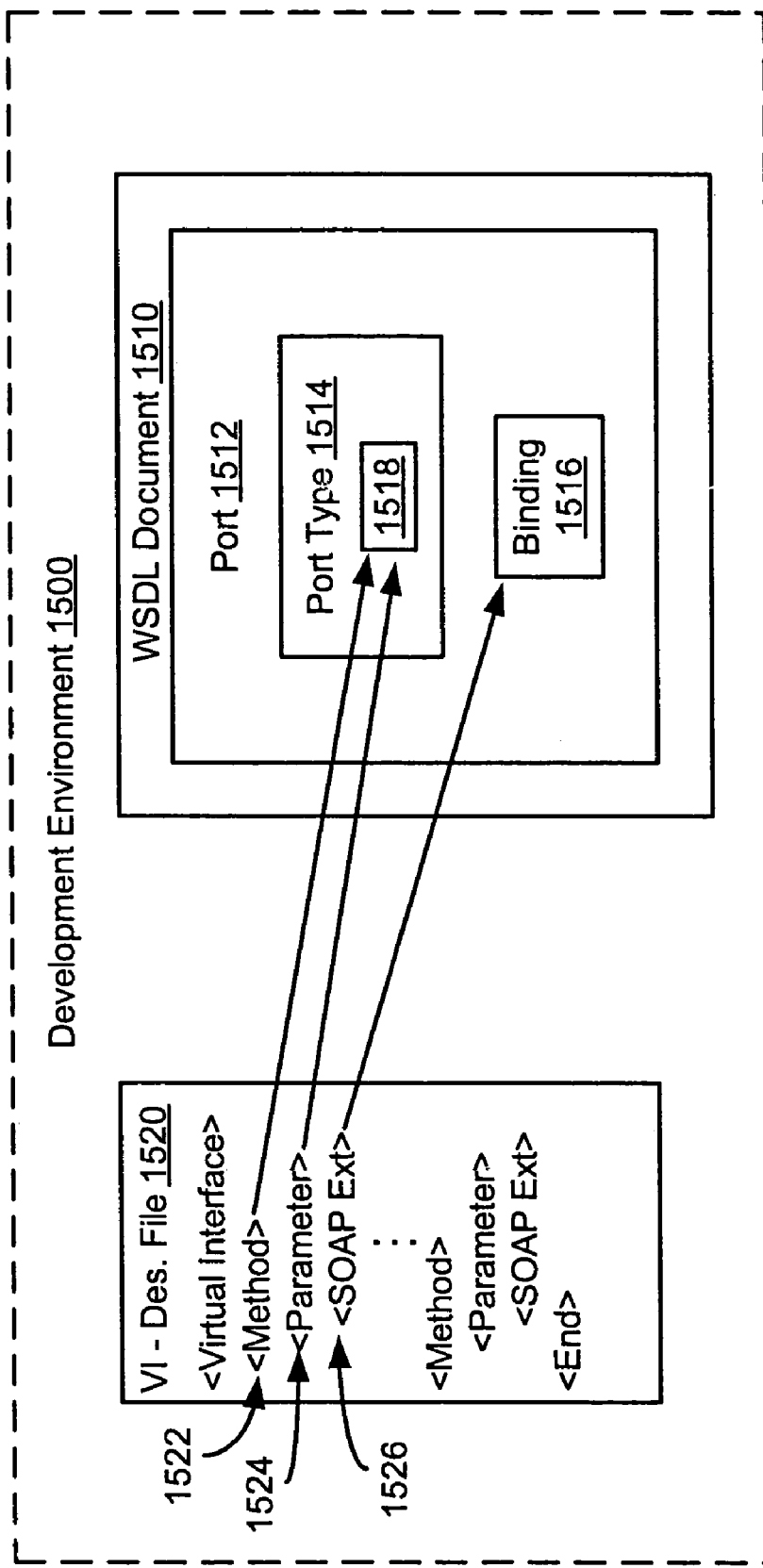
FIG. 15 is a conceptual diagram illustrating a development environment generating a Web service description based, at least in part, on a virtual interface descriptor file.

FIG. 15 is a conceptual diagram illustrating development environment 1500 generating Web service description 1510 based, at least in part, on virtual interface descriptor file 1520. Web service description 1510 may be, for example, a WSDL document. In an embodiment, WSDL document 1510 includes port 1512 which define s, at least in part, the operations of the Web service and the communication protocols (or bindings) used by the operations. The illustrated embodiment of port 1512 includes port type element (or, for ease of reference, port type) 1514 and binding element (or, for ease of reference, binding) 1516. Port type element 1514 may define one or more Web service operations and the messages that the defined operations use (e.g., operation 1518). In an embodiment, port 1512 is a WSDL port and port type 1514 is a WSDL port type.

In an embodiment, binding 1516 may define message formats and communication protocol details for port 1512. In an embodiment, binding 1516 specifies a transport protocol to be used. Examples of transport protocols that may be used include, but are not limited to, HyperText Transfer Protocol (HTTP), SOAP over HTTP, SOAP over File Transfer Protocol (FTP), SOAP over Simple Mail Transfer Protocol (SMTP), and the like. The HTTP protocol refers to any of the HTTP protocols including, for example, the protocol described in Request For Comments (RFC) 2616 entitled, "HyperText Transport Protocol—HTTP/1.1," June 1999 (hereinafter, the HTTP protocol). The File Transfer Protocol refers to any of the FTPs including, for example, the FTP described in RFC 959 entitled, "File Transfer Protocol," October 1985. The Simple Mail Transfer Protocol refers to any of the SMTPs including, for example, the SMTP described in RFC 2821 and entitled, "Simple Mail Transfer Protocol," April 2001.

Virtual interface descriptor file 1520 includes, for example, method element 1522, parameter element 1524, and SOAP extensions element 1526. Method element 1522 may include data pertaining to a method of an associated Web service implementation such as whether the method is to be exposed in the Web service and/or a name for the method. Parameter element 1524 may include parameter specific data such as a default value for the parameter and/or an indication of whether the parameter is to be exposed in the Web service. SOAP extensions element 1526 may include data to define how a method and/or parameter are to be represented in a SOAP message (e.g., whether a parameter is represented as an element or an attribute).

In an embodiment, development environment 1500 parses the information contained in virtual interface descriptor file 1520 and maps the parsed data into WSDL document 1510. For example, development environment 1500 may map the data contained in method element 1522 and parameter element 1524 to port type element 1514 of WSDL document 1510. Similarly, development environment 1500 may map the data contained in SOAP extensions element 1526 to binding 1516 of WSDL document 1510. In alternative embodiments, the structures of WSDL document 1510 and/or virtual interface descriptor file 1520 may be different than the structures illustrated in FIG. 15. In addition, the mapping of information between virtual interface descriptor file 1520 and WSDL document 1510 may vary in an alternative embodiment of the invention.

Figure 1:
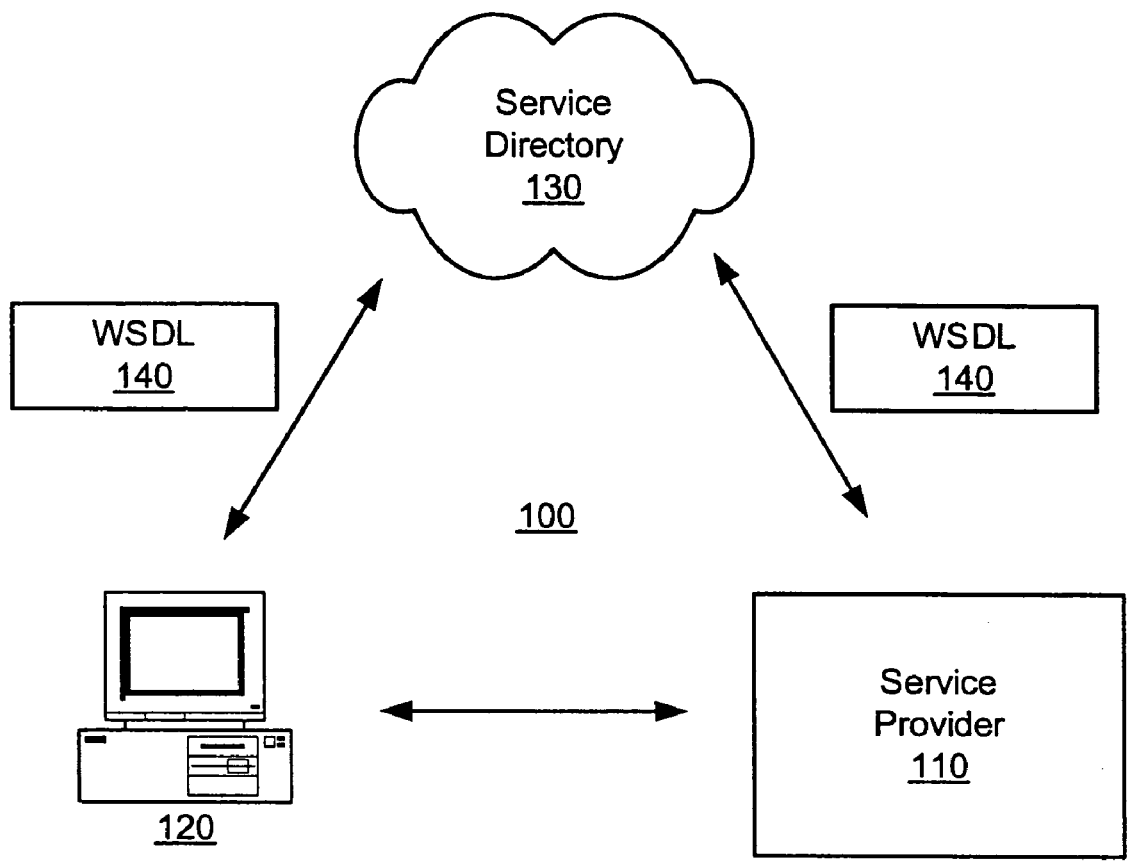
FIG. 1 is a block diagram of the basic architecture of a conventional Web service framework.

Referring again to FIG. 7, the Web service description (e.g., WSDL document 1510, shown in FIG. 15), may be published to a service directory (e.g., service directory 130, shown in FIG. 1). The term "publish" refers to providing the Web service description to the service directory (e.g., via a network) so that the directory may make the Web service description available to one or more potential Web service consumers. In one embodiment, the service directory implements, at least in part, the UDDI specification.

Figure 16:
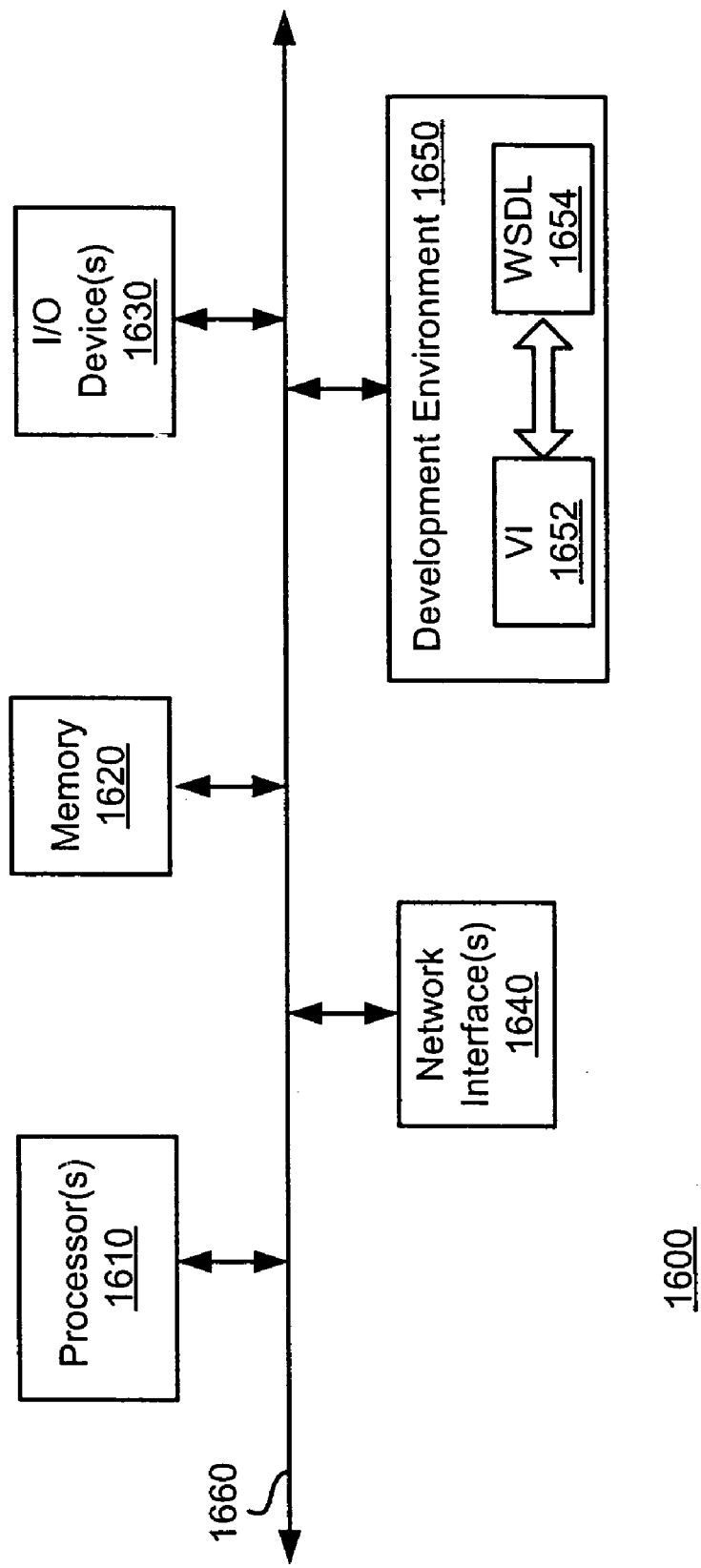
FIG. 16 is a block diagram of a node implemented according to an embodiment of the invention.

FIG. 16 is a block diagram of node 1600 implemented according to an embodiment of the invention. Node 1600 may include: processor(s) 1610, memory 1620, one or more Input/Output devices 1630, network interface(s) 1640, and development environment 1650. The illustrated elements may be connected together through system interconnection 1660. Processor(s) 1610 may include a microprocessor, microcontroller, field programmable gate array (FPGA), application specific integrated circuit (ASIC), central processing unit (CPU), programmable logic device (PLD), and similar devices that access instructions from system storage (e.g., memory 1620), decode them, and execute those instructions by performing arithmetic and logical operations.

Development environment 1650 may enable node 1600 to create virtual interface descriptor file 1652. In addition, development environment 1650 may enable node 1600 to generate WSDL document 1654 (or other Web service description) based, at least in part, on virtual interface descriptor file 1652. Development environment 1650 may be executable content, control logic (e.g., ASIC, PLD, FPGA, etc.), firmware, or some combination thereof, in an embodiment of the invention. In embodiments of the invention in which development environment 1650 is executable content, it may be stored in memory 1620 and executed by processor(s) 1610.

Memory 1620 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1620 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1620 may store program modules such as routines, programs, objects, images, data structures, program data, and other program modules that perform particular tasks or implement particular abstract data types that facilitate system use.

One or more I/O devices 1630 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 1660 permits communication between the various elements of node 1600. System interconnection 1660 may include a wide variety of signal lines including one or more of a memory bus, peripheral bus, local bus, host bus, bridge, optical, electrical, acoustical, and other propagated signal lines.

Elements of embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for generating a virtual interface for a Web service, the method comprising:
   receiving a selection input selecting a Web service implementation, the selected Web service implementation to provide logic for a Web service to a Web service client;
   receiving a definition input defining a virtual interface of the selected Web service implementation, the received definition input containing a generic metadata defining at least one view of a plurality of views of the selected Web service implementation, the generic metadata providing an abstraction layer over endpoint types underlying the logic for the Web service, the plurality of views selectively exposing methods and parameters of the Web service implementation, the virtual interface corresponding to a plurality of Web service definition descriptor files containing non-system-specific data for the Web service;
   creating a virtual interface descriptor file that, when combined with one of the plurality of corresponding Web service definition descriptor files for the virtual interface, provides a system independent design time description of the Web service; and
   generating a Web service description of the at least one of the plurality of views of the selected Web service implementation based, at least in part, on the virtual interface descriptor file, the virtual interface descriptor file including the received definition input containing the generic metadata defining the at least one view of the plurality of views of the selected Web service implementation and providing the abstraction layer over the endpoint types underlying the logic for the Web service.

2. The method of claim 1, wherein receiving the selection input selecting the Web service implementation comprises:
   receiving the selection input selecting an Enterprise Java-Bean™.

3. The method of claim 1, wherein receiving the selection input selecting the Web service implementation comprises:
   receiving the selection input selecting a JAVA class.

4. The method of claim 1, wherein receiving the definition input defining the virtual interface of the selected Web service implementation comprises:
   receiving metadata specifying a method of the Web service implementation; and
   receiving metadata defining a representation of the specified method.

5. The method of claim 4, wherein receiving the definition input defining the representation of the specified method comprises at least one of:
   receiving metadata specifying whether the specified method is to be exposed in a Web service;
   receiving metadata specifying a name for the specified method; and
   receiving metadata specifying a namespace for the specified method.

6. The method of claim 4, wherein receiving the definition input defining the representation of the specified method further comprises:
   receiving metadata specifying a parameter of the specified method; and
   receiving metadata defining a representation of the specified parameter.

7. The method of claim 6, wherein receiving the definition input defining the representation of the specified parameter comprises at least one of:
   receiving metadata indicating a name for the specified parameter;
   receiving metadata indicating an initial value for the specified parameter;
   receiving metadata indicating whether the specified parameter is optional; and
   receiving metadata indicating whether the specified parameter is to be sent as a header in a Simple Object Access Protocol (SOAP) message.

8. The method of claim 7, wherein receiving the definition input defining the representation of the specified parameter further comprises:
receiving metadata indicating the specified parameter is to be represented as an attribute in the SOAP message.

9. The method of claim 1, wherein receiving the definition input defining the virtual interface of the selected Web service implementation comprises:
receiving metadata specifying a class of the Web service implementation; and
receiving metadata defining a representation of a Simple Object Access Protocol (SOAP) message for the specified class.

10. The method of claim 9, wherein receiving the definition input defining the representation of the SOAP message for the specified class comprises:
receiving metadata indicating a namespace to provide a schema for the specified class.

11. The method of claim 1, wherein generating the Web service description based, at least in part, on the virtual interface descriptor file combined with one of the corresponding plurality of Web service definition descriptor files for the virtual interface comprises:
generating a Web Service Description Language (WSDL) file based, at least in part, on the virtual interface descriptor file, combined with one of the corresponding plurality of Web service definition descriptor files for the virtual interface.

12. The method of claim 1, further comprising:
publishing the Web service description on a service directory.

13. An apparatus for generating a virtual interface for a Web service, the apparatus comprising:
a development environment to create a Web service implementation; and
a processor and logic executable thereon to
receive a selection input selecting the Web service implementation, the selected Web service implementation to provide logic for a Web service to a Web service client;
receive a definition input defining an abstraction of the selected Web service implementation, the received definition input containing a generic metadata defining the abstraction of the selected Web service implementation, the abstraction including an abstraction layer over endpoint types underlying the logic for the Web service, the abstraction corresponding to a plurality of Web service definition descriptor files containing non-system-specific data for the Web service;
create a virtual interface descriptor file that, when combined with one of the plurality of corresponding Web service definition descriptor files for the abstraction, provides a system independent design time description of the Web service; and
generate a Web service description of the selected Web service implementation based, at least in part, on the virtual interface descriptor file, the virtual interface descriptor file including the received definition input containing the generic metadata defining the abstraction of the selected Web service implementation, the abstraction including the abstraction layer over the endpoint types underlying the logic for the Web service.

14. The apparatus of claim 13, wherein the logic executable thereon to receive definition input defining the abstraction of the selected Web service implementation comprises logic executable thereon to:
receive input specifying a method of the Web service implementation; and
receive input defining a representation of the specified method.

15. The apparatus of claim 14, wherein the logic executable thereon to receive input defining the representation of the specified method comprises logic executable thereon to:
receive input specifying whether the specified method is to be exposed in the Web service;
receive input specifying a name for the method; and
receive input specifying a namespace for the specified method.

16. A computer system having a processor, the computer system comprising:
means for receiving a selection input selecting a Web service implementation, the selected Web service implementation to provide logic for a Web service to a Web service client;
means for receiving a definition input defining an abstraction of the selected Web service implementation, the received definition input containing a generic metadata defining the abstraction of the selected Web service implementation, the abstraction including an abstraction layer over endpoint types underlying the logic for the Web service, the abstraction corresponding to a plurality of Web service definition descriptor files containing non-system-specific data for the Web service;
means for creating a virtual interface descriptor file that, when combined with one of the plurality of corresponding Web service definition descriptor files for the virtual interface abstraction, provides a system independent design time description of the Web service; and
means for generating a Web service description of the selected Web service implementation based, at least in part, on the virtual interface descriptor file, the virtual interface descriptor file including the received definition input containing the generic metadata defining the abstraction of the selected Web service implementation, the abstraction including the abstraction layer over the endpoint types underlying the logic for the Web service.

17. The system of claim 16, wherein the means for receiving the selection input defining the abstraction of the selected Web service implementation comprises:
means for receiving input specifying a method of the Web service implementation; and
means for receiving input defining a representation of the specified method.

18. The system of claim 17, wherein the means for receiving the selection input defining the representation of the specified method comprises at least one of:
means for receiving input specifying whether the specified method is to be exposed in a Web service;
means for receiving input specifying a name for the method; and
means for receiving input specifying a namespace for the specified method.

19. The system of claim 17, wherein the means for receiving the selection input defining the representation of the specified method further comprises:
means for receiving input specifying a parameter of the specified method; and
means for receiving input defining a representation of the specified parameter.

20. The system of claim 19, wherein the means for receiving input defining the representation of the specified parameter comprises at least one of:
means for receiving input indicating a name for the specified parameter;

means for receiving input indicating an initial value for the specified parameter;

means for receiving input indicating whether the specified parameter is optional; and means for receiving input indicating whether the specified parameter is to be sent as a header in a Simple Object Access Protocol (SOAP) message.

21. The system of claim 20, wherein the means for receiving input defining the representation of the specified parameter further comprises:

means for receiving input indicating the specified parameter is to be represented as an attribute in the SOAP message.

22. An article of manufacture comprising:

a machine-readable medium providing instructions that, when executed by an apparatus, cause the apparatus to receive an input selecting a Web service implementation, the selected Web service implementation to provide logic for a Web service to a Web service client;

receive a definition input defining an abstraction of the selected Web service implementation, the received definition input containing generic metadata defining the abstraction of the selected Web service implementation, the abstraction including an abstraction layer over endpoint types underlying the logic for the Web service, the abstraction corresponding to a plurality of Web service definition descriptor files containing non-system-specific data for the Web service;

create a virtual interface descriptor file that, when combined with one of the plurality of corresponding Web service definition descriptor files for the abstraction, provides a system independent design time description of the Web service; and generate a Web service description of the selected Web service implementation based, at least in part, on the virtual interface descriptor file, the virtual interface descriptor file including the received definition input containing the generic metadata defining the abstraction of the selected Web service implementation, the abstraction including the abstraction layer over the endpoint types underlying the logic for the Web service.

23. The article of manufacture of claim 22, wherein the instructions that, when executed by the apparatus, cause the apparatus to receive definition input defining the abstraction of the selected Web service implementation cause the apparatus to receive input specifying a method of the Web service implementation; and receive input defining a representation of the specified method.

24. The article of manufacture of claim 23, wherein the instructions that, when executed by the apparatus, cause the apparatus to receive input defining the representation of the specified method cause the apparatus to receive input specifying whether the specified method is to be exposed in a Web service.

25. The article of manufacture of claim 23, wherein the instructions that, when executed by the apparatus, cause the apparatus to receive input defining the representation of the specified method cause the apparatus to receive input specifying a name for the specified method.

26. The article of manufacture of claim 23, wherein the instructions that, when executed by the apparatus, cause the apparatus to receive input defining the representation of the specified method cause the apparatus to receive input specifying a namespace for the specified method.

27. The article of manufacture of claim 23, wherein the electronically accessible medium provides further instructions that, when executed by the apparatus, cause the apparatus to receive input specifying a parameter of the specified method; and receive input defining a representation of the specified parameter.

28. The article of manufacture of claim 27, wherein the instructions that, when executed by the apparatus, cause the apparatus to receive input defining the representation of the specified parameter cause the apparatus to receive input indicating a name for the specified parameter.

29. The article of manufacture of claim 27, wherein the instructions that, when executed by the apparatus, cause the apparatus to receive input defining the representation of the specified parameter cause the apparatus to receive input indicating an initial value for the specified parameter.

30. The article of manufacture of claim 27, wherein the instructions that, when executed by the apparatus, cause the apparatus to receive input defining the representation of the specified parameter cause the apparatus to receive input indicating whether the specified parameter is to be sent as a header in a Simple Object Access Protocol (SOAP) message.

31. The article of manufacture of claim 27, wherein the instructions that, when executed by the apparatus, cause the apparatus to receive input defining the representation of the specified parameter cause the apparatus to receive input indicating the specified parameter is to be represented as an attribute in the SOAP message.

* * * * *

UNITED STATES PATENT AND TRADEMARK OFFICE
CERTIFICATE OF CORRECTION

PATENT NO. : 7,617,480 B2
APPLICATION NO. : 10/856287
DATED : November 10, 2009
INVENTOR(S) : Falter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this

Nineteenth Day of October, 2010

David J. Kappos
*Director of the United States Patent and Trademark Office*